United States Patent
Pal

(10) Patent No.: US 11,661,954 B2
(45) Date of Patent: May 30, 2023

(54) CABIN AIR COMPRESSOR WITH BLEED SCOOP AND REMOVABLE BLEED DUCT FILTER

(71) Applicant: Hamilton Sundstrand Corporation, Charlotte, NC (US)

(72) Inventor: Debabrata Pal, Hoffman Estates, IL (US)

(73) Assignee: HAMILTON SUNDSTRAND CORPORATION, Charlotte, NC (US)

(*) Notice: Subject to any disclaimer, the term of this patent is extended or adjusted under 35 U.S.C. 154(b) by 0 days.

(21) Appl. No.: 17/469,330

(22) Filed: Sep. 8, 2021

(65) Prior Publication Data

US 2023/0075905 A1 Mar. 9, 2023

(51) Int. Cl.
*F04D 29/52* (2006.01)
*F04D 13/06* (2006.01)

(52) U.S. Cl.
CPC ........... *F04D 29/522* (2013.01); *F04D 13/06* (2013.01)

(58) Field of Classification Search
CPC ................................ F04D 29/522; F04D 13/06
See application file for complete search history.

(56) References Cited

U.S. PATENT DOCUMENTS

| | | | |
|---|---|---|---|
| 5,980,218 A * | 11/1999 | Takahashi | F04D 29/5806 417/369 |
| 7,624,944 B2 | 12/2009 | Parikh et al. | |
| 7,861,968 B2 | 1/2011 | Parikh et al. | |
| 8,863,548 B2 | 10/2014 | Hipsky | |
| 9,181,959 B2 | 11/2015 | Rosen et al. | |
| 9,254,920 B2 | 2/2016 | Zhou et al. | |
| 9,381,787 B2 | 7/2016 | Vignali et al. | |
| 9,685,835 B2 | 6/2017 | Colson et al. | |
| 10,807,722 B2 | 10/2020 | Himmelmann | |
| 2015/0104301 A1* | 4/2015 | Colson | H02K 5/04 415/206 |
| 2017/0144769 A1* | 5/2017 | Beers | G01P 5/16 |

FOREIGN PATENT DOCUMENTS

| | | |
|---|---|---|
| CN | 203722411 U | 7/2014 |
| CN | 108590840 A | 9/2018 |
| WO | 9319982 A1 | 10/1993 |

OTHER PUBLICATIONS

Partial European Search Report for EP Application No. 22191045.8, dated Jan. 23, 2023, pp. 1-14.

* cited by examiner

*Primary Examiner* — Grant Moubry
*Assistant Examiner* — Ruben Picon-Feliciano
(74) *Attorney, Agent, or Firm* — Cantor Colburn LLP

(57) ABSTRACT

Disclosed is an cabin air compressor (CAC), having a CAC inlet defining a bleed inlet and has a bleed inlet aperture that circumferentially extends about the CAC inlet to define a bleed inlet forward end and a bleed inlet aft end; and a bleed duct that extends from a bleed duct inlet located at the CAC inlet to a bleed duct outlet located at a CAC motor section and is fluidly connected to the bleed inlet; and a scoop defining a scoop aft end connected to the bleed inlet aft end, and a scoop body extending toward a case forward end of the case to a scoop forward end, wherein the scoop is frusto-conical and converges toward the case forward end to provide a radial inlet gap between the scoop forward end and the bleed inlet forward end.

8 Claims, 6 Drawing Sheets

CABIN AIR COMPRESSOR WITH BLEED SCOOP AND REMOVABLE BLEED DUCT FILTER

BACKGROUND

The subject matter disclosed herein relates to a cabin air compressor with a bleed scoop and a removable bleed duct filter.

A cabin air compressor includes a motor section having a motor that drives the compressor. Cooling of the motor may be required to prolong the useful life of the cabin air compressor.

BRIEF DESCRIPTION

Disclosed is an cabin air compressor (CAC), including: a rotor that includes an impeller; a motor connected to the rotor to cause the rotor to rotate and move the impeller; a case that includes: a rotor section that surrounds the rotor; a motor section that surrounds the motor and is adjacent to the rotor section; a CAC inlet that is adjacent to the rotor section and supplies air to the rotor section, such that the CAC inlet is forward of the rotor section and the motor section is aft of the rotor section, the CAC inlet defining a bleed inlet and has a bleed inlet aperture that circumferentially extends about the CAC inlet to define a bleed inlet forward end and a bleed inlet aft end; and a CAC discharge that is fluidly coupled to the impeller; a bleed duct that extends from a bleed duct inlet located at the CAC inlet to a bleed duct outlet located at the motor section and is fluidly connected to the bleed inlet; and a scoop defining a scoop aft end connected to the bleed inlet aft end, and a scoop body extending toward a case forward end of the case to a scoop forward end, wherein the scoop is frustoconical and converges toward the case forward end to provide a radial inlet gap between the scoop forward end and the bleed inlet forward end.

In addition to one or more of the above disclosed aspects or as an alternate, the scoop aft end is radially aligned with an inlet surface that extends aft from the case forward end to the bleed inlet forward end, and the scoop body is disposed at a scoop angle of between 5 and 30 degrees to a center axis of the CAC inlet.

In addition to one or more of the above disclosed aspects or as an alternate, the scoop forward end is forward of the bleed inlet forward end to define an axial inlet overlap.

In addition to one or more of the above disclosed aspects or as an alternate, the axial inlet overlap is equal to or greater than the radial inlet gap.

In addition to one or more of the above disclosed aspects or as an alternate, the CAC includes a bleed cavity defined by a bleed cavity surface that extends from the bleed inlet forward end to the bleed inlet aft end of the bleed inlet aperture, wherein the bleed cavity surrounds the CAC inlet, wherein the bleed cavity surface defines a bleed conduit aperture, and a bleed conduit extends radially outward from the bleed conduit aperture; and a filter housing removably connected between the bleed conduit and the bleed duct.

In addition to one or more of the above disclosed aspects or as an alternate, the filter housing has a filter housing inlet flange; and the bleed conduit has a bleed conduit outlet flange that is releasably connected to the filter housing inlet flange.

In addition to one or more of the above disclosed aspects or as an alternate, the filter housing has a filter housing outlet flange; and the bleed duct has a bleed duct inlet flange that is releasably connected to the filter housing outlet flange.

In addition to one or more of the above disclosed aspects or as an alternate, the bleed duct defines an air conduit port through which an air conduit extends such that an outlet of the air conduit is directed toward filter media in the filter housing; and the air conduit is fluidly coupled to a pressurized air source.

In addition to one or more of the above disclosed aspects or as an alternate, the CAC includes a control valve that is fluidly coupled between the pressurized air source and the air conduit, wherein, in operation, the control valve is normally in a closed state and is configured to transition to an opened state when a pressure-drop across the filter media is greater than a threshold.

In addition to one or more of the above disclosed aspects or as an alternate, in the opened state, the control valve is configured to transition to the closed state after a predetermined period of time.

Disclosed is another embodiment of a cabin air compressor (CAC), including: a rotor that includes an impeller; a motor connected to the rotor to cause the rotor to rotate and move the impeller; a case that includes: a rotor section that surrounds the rotor; a motor section that surrounds the motor and is adjacent to the rotor section; a CAC inlet that is adjacent to the rotor section and supplies air to the rotor section, such that the CAC inlet is forward of the rotor section and the motor section is aft of the rotor section, the CAC inlet defining a bleed inlet and has a bleed inlet aperture that circumferentially extends about the CAC inlet to define a bleed inlet forward end and a bleed inlet aft end; and a CAC discharge that is fluidly coupled to the impeller; a bleed duct that extends from a bleed duct inlet located at the CAC inlet to a bleed duct outlet located at the motor section and is fluidly connected to the bleed inlet, wherein: a bleed inlet defined in the CAC inlet is fluidly coupled with the bleed duct inlet and has a bleed inlet aperture that circumferentially extends about the CAC inlet to define a bleed inlet forward end and a bleed inlet aft end; and a bleed cavity defined by a bleed cavity surface that extends from the bleed inlet forward end to the bleed inlet aft end of the bleed inlet aperture, wherein the bleed cavity surrounds the CAC inlet, wherein the bleed cavity surface defines a bleed conduit aperture; a bleed conduit that extends radially outward from the bleed conduit aperture; and a filter housing removably connected between the bleed conduit and the bleed duct.

In addition to one or more of the above disclosed aspects of the another embodiment, or as an alternate, the filter housing has a filter housing inlet flange; and the bleed conduit has a bleed conduit outlet flange that is releasably connected to the filter housing inlet flange.

In addition to one or more of the above disclosed aspects of the another embodiment, or as an alternate, the filter housing has a filter housing outlet flange; and the bleed duct has a bleed duct inlet flange that is releasably connected to the filter housing outlet flange.

In addition to one or more of the above disclosed aspects of the another embodiment, or as an alternate, the bleed duct defines an air conduit port through which an air conduit extends such that an outlet of the air conduit is directed toward filter media in the filter housing; and the air conduit is fluidly coupled to a pressurized air source.

In addition to one or more of the above disclosed aspects of the another embodiment, or as an alternate, the CAC includes a control valve that is fluidly coupled between the pressurized air source and the air conduit, wherein, in operation, the control valve is normally in a closed state and is configured to transition to an opened state when a pressure-drop across the filter media is greater than a threshold.

In addition to one or more of the above disclosed aspects of the another embodiment, or as an alternate, in the opened state, the control valve is configured to transition to the closed state after a predetermined period of time.

Disclosed is a method of operating a cabin air compressor (CAC), including: directing airflow into a CAC inlet at a forward end of a case of the CAC, to an impeller that is caused to rotate by a rotor and is surrounded by a rotor section, and out of a discharge that is fluidly coupled to the impeller; and directing a bleed portion of the airflow from the CAC inlet, through a bleed duct, to a motor that is surrounded by a motor section via a radial inlet gap in the CAC inlet defined between: a scoop forward end of a scoop that is connected to a bleed inlet aft end of a bleed inlet that is defined in the CAC inlet, wherein the scoop is frustoconical and converges toward the forward end of the case; and a bleed inlet forward end of the bleed inlet, wherein the bleed inlet circumferentially extends about the CAC inlet to define the bleed inlet forward end and the bleed inlet aft end.

In addition to one or more of the above disclosed aspects of the method, or as an alternate, the method includes directing the bleed portion of the airflow through a filter housing that is removably connected to a bleed conduit of the CAC inlet, wherein the bleed conduit extends from a bleed conduit aperture defined by a bleed cavity surface, and wherein the bleed cavity surface extends from the bleed inlet forward end to the bleed inlet aft end and surrounds the CAC inlet; and directing the bleed portion from the filter housing through the bleed duct.

In addition to one or more of the above disclosed aspects of the method, or as an alternate, the method includes directing pressurized air, through an air conduit outlet of an air conduit extending through an air conduit port defined in the bleed duct, toward filter media in the filter housing.

In addition to one or more of the above disclosed aspects of the method, or as an alternate, the method includes transitioning a control valve, that is fluidly coupled to the air conduit, intermediate of the air conduit outlet and a pressurized air source, to an opened state when a pressure drop across the filter media exceeds a threshold; and transitioning the control valve to a closed state after a predetermined period of time.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
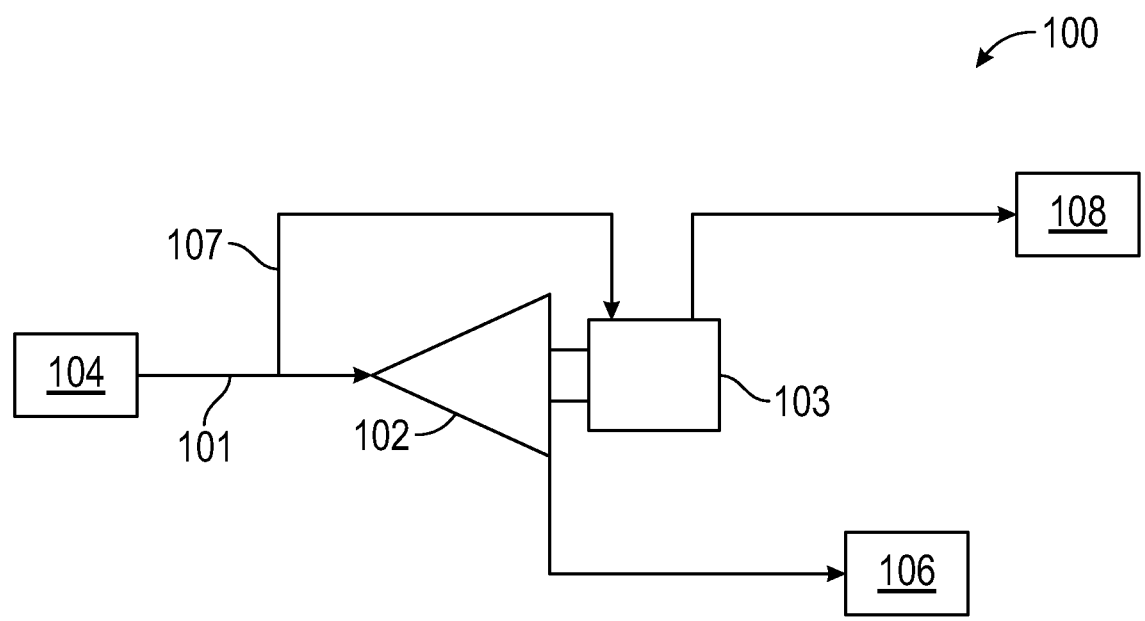
FIG. 1 is a schematic of a cabin air compressor (CAC) where embodiments of the present invention can be implemented.

Turning to FIG. 1, an aircraft may include one or more cabin air compressors (CACs) 100 which compress an airflow 101, via a compressor 102 driven by a motor 103, with the air entering from an outside source 104, such as bleed air from an engine, or from a ram air system. The compressed air is delivered to an environmental control system (ECS) 106, which includes one or more heat exchangers that bring the compressed air to a desired temperature, and then the compressed air is delivered to the aircraft cabin. After passing through the cabin, the air is typically exhausted to the outside or recirculated as the case may be. The motor 103 is typically an air-cooled electric motor, which may be cooled by air bleed from the compressor 103 via a bleed duct 107. The spent air may then be dumped overboard 108.

Figure 2:
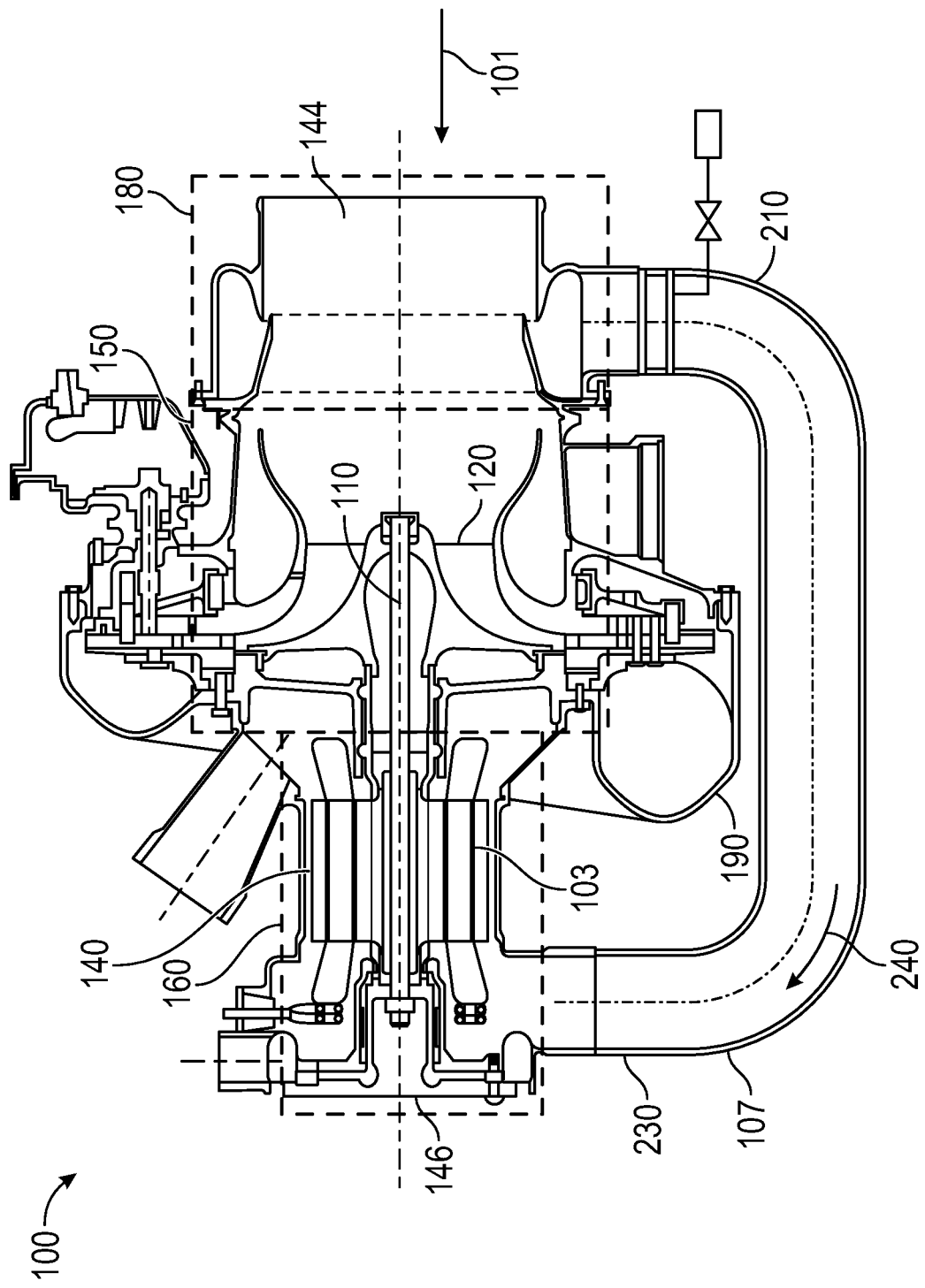
FIG. 2 shows a cabin air compressor (CAC) according to an embodiment that includes a bleed scoop and a removable bleed duct filter.

Turning to FIG. 2, the CAC includes a rotor 110 and an impeller 120. A motor 103 is connected to the rotor 110 to cause the rotor 110 to rotate and move the impeller 120. A case 140 of the CAC 100 is shown, extending from forward to aft ends 144, 146. The case 140 includes a rotor section 150 that surrounds the rotor 110. It is to be appreciated that the rotor section 150, with the impeller 120 and rotor 110 therein, corresponds to the compressor 102 of FIG. 1. A motor section 160 surrounds the motor 103 and is adjacent to the rotor section 150. A CAC inlet 180 is adjacent to the rotor section 150 such that the CAC inlet 180, e.g., which may receive RAM air or air from an engine (FIG. 1), is forward of the rotor section 150 and the motor section is aft of the rotor section 150. The CAC inlet 180 supplies an airflow 101 to the rotor section 150. A CAC discharge 190 is fluidly coupled to the impeller 120, which may be directed to a heat exchanger of an ECS 106 (FIG. 1) and thereafter to the cabin. A bleed duct 107 extends from a bleed duct inlet 210 located in the CAC inlet 180 to a bleed duct outlet 230 located at the motor section 160.

The bleed duct 107 directs a portion 240 of the airflow 101 (e.g., bleed portion of the airflow), to the motor 103 for cooling the motor 103 during normal operation. A portion of the motor cooling airflow flows over the motor stator end turns, and through stator cooling channels located on an outer diameter of the motor stator (not shown). Another portion of motor cooling air flow flows through the rotor stator airgap. Adequate cooling of the motor provides for increasing a mean-time-before-failure (MTBF) of the CAC motor 103. Thus, the pathway for the airflow 101 that is diverted from the inlet 180 to the bleed duct 107 may be configured to allow for sufficient airflow to reach the motor 103. In addition, the pathway may be configured to prevent foreign object debris (FOD), which may enter the inlet 180, from reaching the motor 103.

Figure 3:
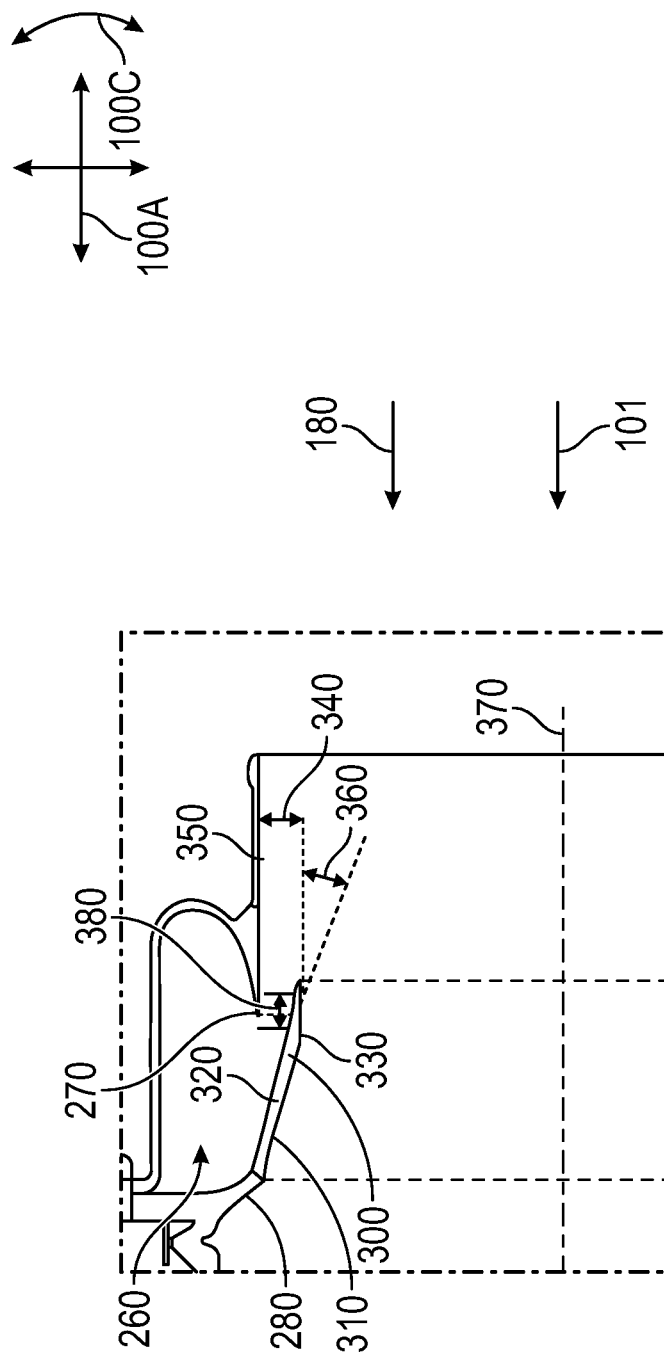
FIG. 3 shows an inlet section of the CAC of FIG. 2 according to an embodiment, showing additional features of the bleed scoop.

Turning to FIG. 3 a more detailed version of the inlet 180 of the CAC 100 (FIG. 2) is shown that enables directing sufficient bleed airflow to the motor 103, to thereby increase the useful life of the CAC 100. A bleed inlet 250 is defined in the CAC inlet 180. The bleed inlet 250 is fluidly coupled with the bleed duct inlet 210 (FIG. 2). The bleed inlet 250 has a bleed inlet aperture 260 that circumferentially extends (in the circumferential direction 100C for the CAC 100)

about the CAC inlet 180 to define a bleed inlet forward end 270 and a bleed inlet aft end 280.

According to an embodiment, a scoop 300 is provided in the CAC inlet 180 for guiding the bleed portion 240 of the airflow 101 into the bleed inlet 250. The scoop 300 defines a scoop aft end 310 that is connected to the bleed inlet aft end 280. A scoop body 320 extends toward the case forward end 144 of the case 140 to a scoop forward end 330. The scoop 300 is frustoconical and converges toward the case forward end 144 to provide a radial inlet gap 340 (in the radial direction 100R for the CAC 100) between the scoop forward end 330 and the bleed inlet forward end 270. The radial inlet gap 340 is sized to be large enough to receive a sufficient amount of bleed airflow for cooling the motor 103. In one embodiment, the scoop aft end 310 is radially aligned with an inlet surface 350 that extends aft from the case forward end 144 to the bleed inlet forward end 270. The scoop body 320 may be disposed at a scoop angle 360 of between 5 and 30 degrees to the inlet airflow 101, e.g., parallel to a center axis 370 of the CAC inlet 180. In one embodiment, the scoop forward end 330 is forward of the bleed inlet forward end 270 to define an axial inlet overlap 380 (in the axial direction 100A for the CAC 100). The axial inlet overlap 380 may be equal to or greater than the radial inlet gap 340.

Figure 4:
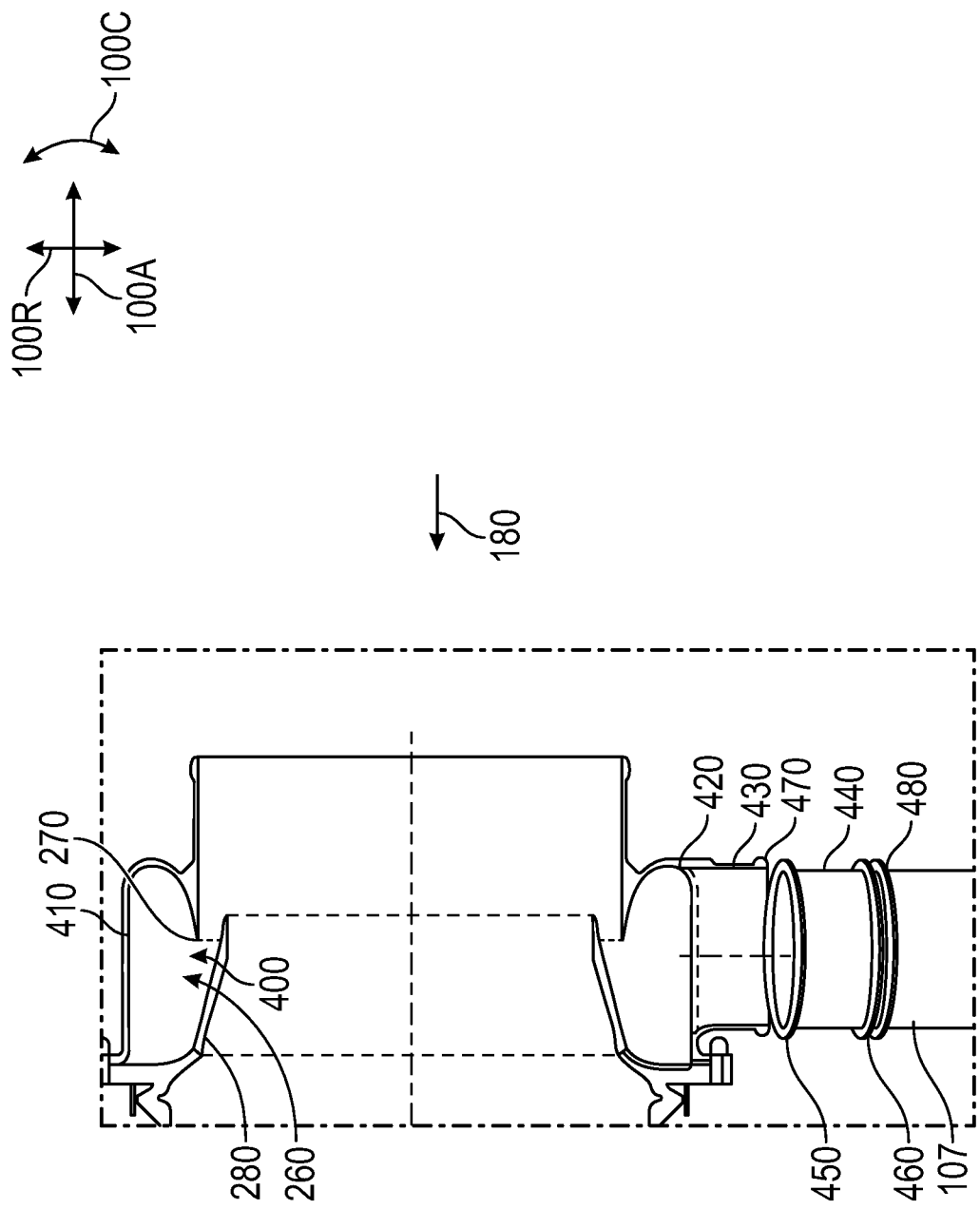
FIG. 4 shows the inlet of the CAC of FIG. 2 according to an embodiment, showing additional features of the removable bleed duct filter.

Turning to FIG. 4, a bleed cavity 400 is defined by a bleed cavity surface 410 that extends from the bleed inlet forward end 270 to the bleed inlet aft end 280 of the bleed inlet aperture 260. The bleed cavity 400 surrounds the CAC inlet 180. The bleed cavity surface 410 defines a bleed conduit aperture 420. A bleed conduit 430 extends radially outward from the bleed conduit aperture 420.

According to an embodiment, a filter housing 440 is removably connected between the bleed conduit 430 and the bleed duct 107. The filter housing 440 has a filter housing inlet flange 450 and a filter housing outlet flange 460. The bleed conduit 430 has a bleed conduit outlet flange 470 that is releasably connected to the filter housing inlet flange 450. The bleed duct 107 has a bleed duct inlet flange 480 that is releasably connected to the filter housing outlet flange 460.

The above disclosed embodiment includes aspects related to the configuration of the scoop 300 at the inlet 180 and the utilization of the filter housing 440, connected between the bleed conduit 430 and the bleed duct 107. In one or more embodiments, however, only one of these aspects may be included in the CAC 100.

Figure 5:
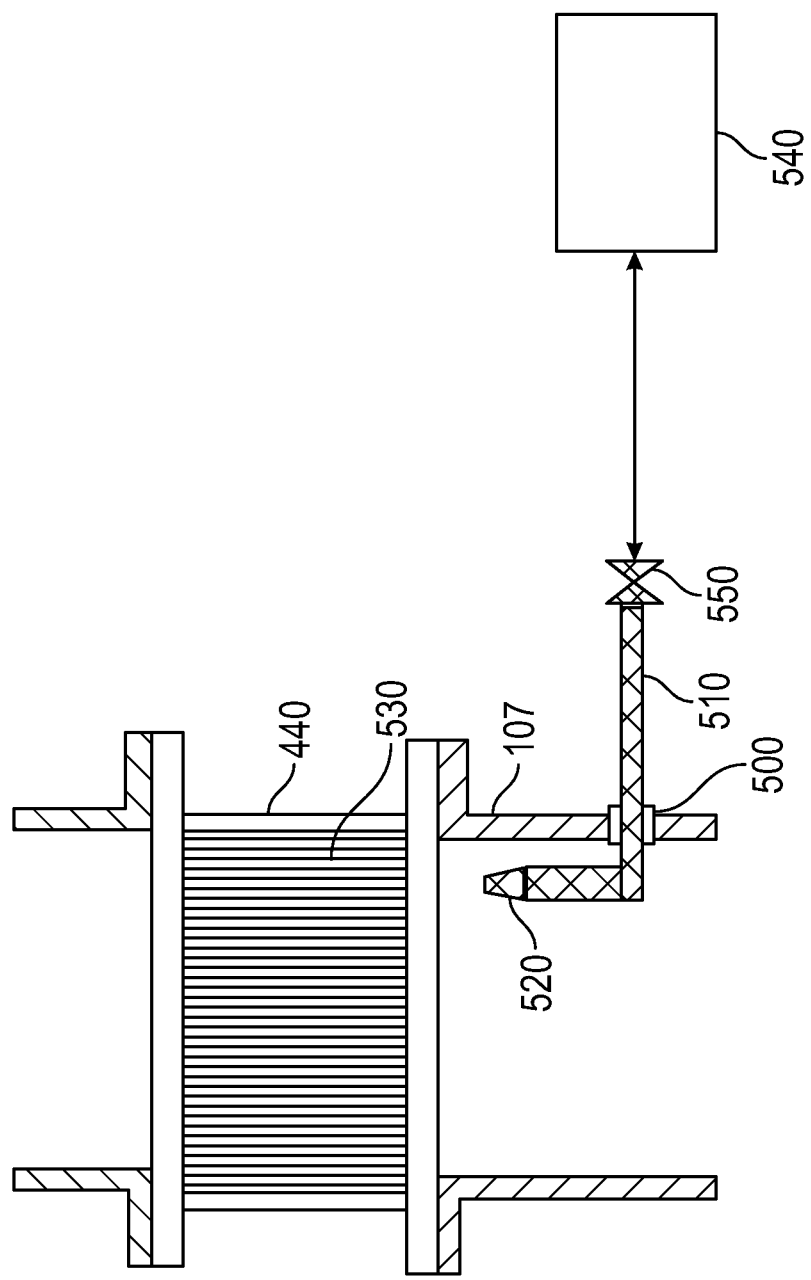
FIG. 5 shows additional features of the removable bleed duct filter, including an air conduit that extends through a bleed duct of the CAC for clearing debris from the removable bleed duct filter.

Turning to FIG. 5, the bleed duct 107 defines an air conduit port 500 through which an air conduit 510 extends. An outlet 520 of the air conduit 510 is directed toward filter media 530 in the filter housing 440. The air conduit 510 is fluidly coupled to a pressurized air source 540. According to an embodiment, a control valve 550 is fluidly coupled between the pressurized air source 540 and the air conduit 510. In operation, the control valve 550 is normally in a closed state and is configured to transition to an opened state when a pressure-drop across the filter media 530 is greater than a threshold. In the opened state, the control valve 550 is configured to transition to the closed state after a predetermined period of time. Thus, should FOD block, completely or partially, the filter media 530, pressurized air can dislodge the FOD to enable bleed air to reach the motor 103. In one embodiment, the pressurized air is applied at a greater pressure than the airflow into the CAC 100. Thus the CAC does not need to be deactivated when applying pressurized air. In on embodiment, air pressurized by the CAC 100, e.g., bled off the CAC discharge 190, may be utilized as the source of pressurized air to clear the filter media 530. In one embodiment, the CAC 100 is taken offline for the period of time required to apply the pressurized air to the filter media 530.

Figure 6:
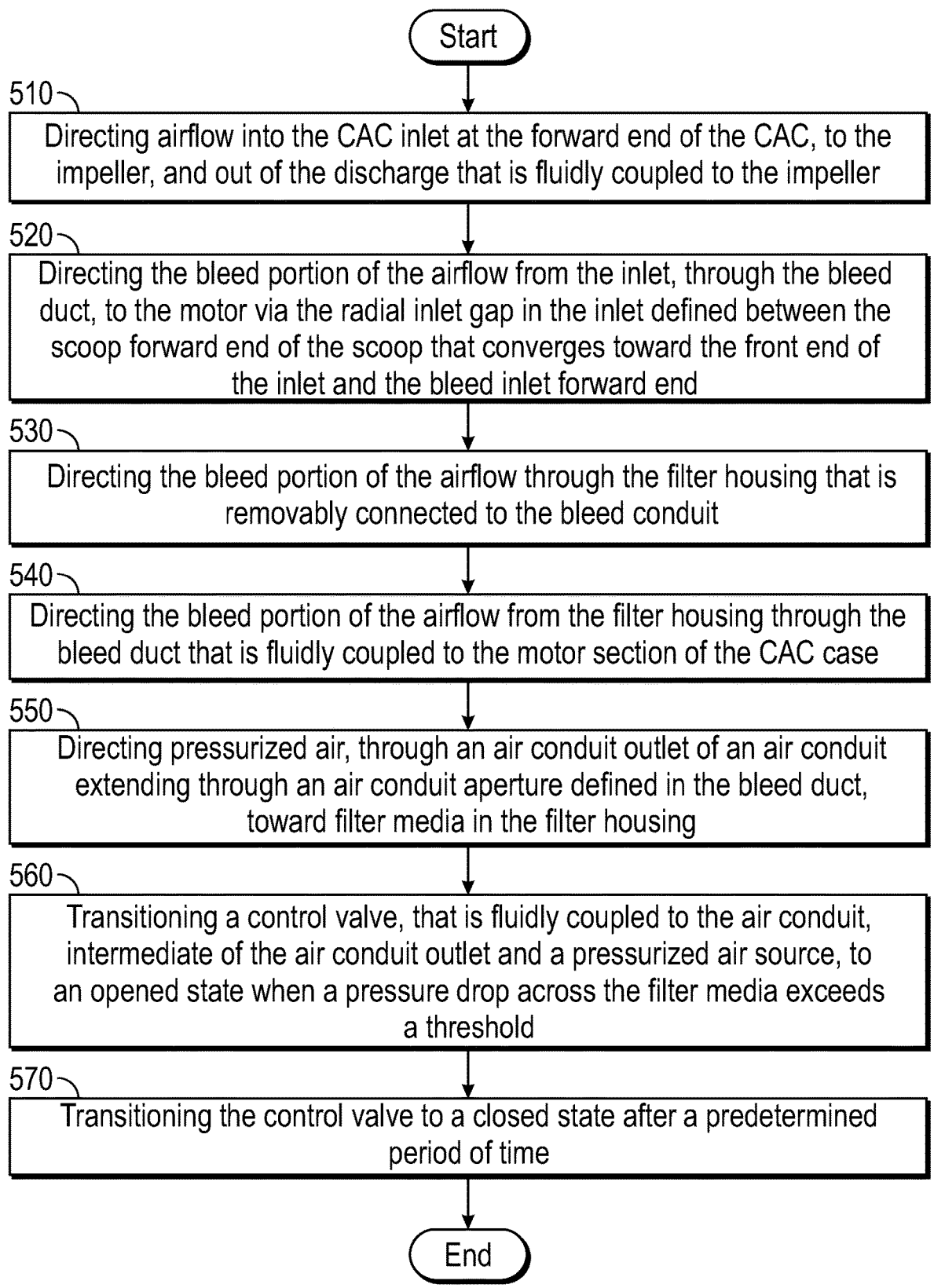
FIG. 6 is a flowchart showing a method of operating a CAC according to an embodiment.

Turning to FIG. 6 a flowchart shows a method of operating the CAC 100. As shown in block 510, the method includes directing airflow into the CAC inlet 180 at the case forward end 144 of the CAC case 140, to the impeller 120, and out of the discharge 190 that is fluidly coupled to the impeller 120. As shown in block 520, the method includes directing the bleed portion 240 of the airflow 101 from the CAC inlet 180, through the bleed duct 107, to the motor 103 via the radial inlet gap 340 in the CAC inlet 180 defined between the scoop forward end 330 of the scoop 300 that converges toward the forward end of the CAC inlet 180 and the bleed inlet forward end 270.

As shown in block 530, the method includes directing the bleed portion 240 of the airflow 101 through the filter housing 440 that is removably connected to the bleed conduit 430. As shown in block 540, the method includes directing the bleed portion 240 of the airflow 101 from the filter housing 440 through the bleed duct 107 that is fluidly coupled to the motor section 160 of the CAC case 140.

As shown in block 550, the method includes directing pressurized air, through the air conduit outlet 520 of the air conduit 510 that extends through the air conduit port 500 defined in the bleed duct 107, toward filter media 530 in the filter housing 440. As shown in block 560, the method includes transitioning the control valve 550, that is fluidly coupled to the air conduit 510, intermediate of the air conduit outlet 520 and the pressurized air source 540, to an opened state when a pressure drop across the filter media 530 exceeds a threshold. As shown in block 570, the method includes transitioning the control valve 550 to a closed state after a predetermined period of time.

The above disclosed embodiments provide an elongated scoop in the CAC inlet section. To increase motor reliability, the elongated scoop may provide an enhanced motor cooling flow utilizing the CAC compressor inlet flow. To prevent ingestion of FOD, which could otherwise reduce a motor cooling flow, a removable filter is provided in the bleed duct. The filter may be automatically cleaned if a pressure-drop across the filter increases beyond a threshold.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A cabin air compressor (CAC), comprising:
a rotor that includes an impeller;
a motor connected to the rotor to cause the rotor to rotate and move the impeller;
a case that includes:
  a rotor section that surrounds the rotor;
  a motor section that surrounds the motor and is adjacent to the rotor section;
  a CAC inlet that is adjacent to the rotor section and supplies air to the rotor section, such that the CAC inlet is forward of the rotor section and the motor section is aft of the rotor section, the CAC inlet defining a bleed inlet and has a bleed inlet aperture that circumferentially extends about the CAC inlet to define a bleed inlet forward end and a bleed inlet aft end; and
  a CAC discharge that is fluidly coupled to the impeller;
a bleed duct that extends from a bleed duct inlet located at the CAC inlet to a bleed duct outlet located at the motor section and is fluidly connected to the bleed inlet; and
a scoop defining a scoop aft end connected to the bleed inlet aft end, and a scoop body extending toward a case forward end of the case to a scoop forward end, wherein the scoop is frustoconical and converges toward the case forward end to provide a radial inlet gap between the scoop forward end and the bleed inlet forward end;
a bleed cavity defined by a bleed cavity surface that extends from the bleed inlet forward end to the bleed inlet aft end of the bleed inlet aperture, wherein the bleed cavity surrounds the CAC inlet, wherein the bleed cavity surface defines a bleed conduit aperture, and a bleed conduit extends radially outward from the bleed conduit aperture; and
a filter housing removably connected between the bleed conduit and the bleed duct, wherein:
the filter housing has a filter housing inlet flange;
the bleed conduit has a bleed conduit outlet flange that is releasably connected to the filter housing inlet flange;
the filter housing has a filter housing outlet flange; and
the bleed duct has a bleed duct inlet flange that is releasably connected to the filter housing outlet flange;
the bleed duct defines an air conduit port through which an air conduit extends such that an outlet of the air conduit is directed toward filter media in the filter housing; and
the air conduit is fluidly coupled to a pressurized air source; and
the CAC further includes a control valve that is fluidly coupled between the pressurized air source and the air conduit, wherein, in operation, the control valve is normally in a closed state and is configured to transition to an opened state when a pressure-drop across the filter media is greater than a threshold.

2. The CAC of claim 1, wherein:
the scoop aft end is radially aligned with an inlet surface that extends aft from the case forward end to the bleed inlet forward end, and the scoop body is disposed at a scoop angle of between 5 and 30 degrees to a center axis of the CAC inlet.

3. The CAC of claim 1, wherein:
the scoop forward end is forward of the bleed inlet forward to define an axial inlet overlap.

4. The CAC of claim 3, wherein:
the axial inlet overlap is equal to or greater than the radial inlet gap.

5. The CAC of claim 1, wherein:
in the opened state, the control valve is configured to transition to the closed state after a predetermined period of time.

6. A cabin air compressor (CAC), comprising:
a rotor that includes an impeller;
a motor connected to the rotor to cause the rotor to rotate and move the impeller;
a case that includes:
  a rotor section that surrounds the rotor;
  a motor section that surrounds the motor and is adjacent to the rotor section;
  a CAC inlet that is adjacent to the rotor section and supplies air to the rotor section, such that the CAC inlet is forward of the rotor section and the motor section is aft of the rotor section, the CAC inlet defining a bleed inlet and has a bleed inlet aperture that circumferentially extends about the CAC inlet to define a bleed inlet forward end and a bleed inlet aft end; and
  a CAC discharge that is fluidly coupled to the impeller;
a bleed duct that extends from a bleed duct inlet located at the CAC inlet to a bleed duct outlet located at the motor section and is fluidly connected to the bleed inlet,
wherein:
  a bleed inlet defined in the CAC inlet is fluidly coupled with the bleed duct inlet and has a bleed inlet aperture that circumferentially extends about the CAC inlet to define a bleed inlet forward end and a bleed inlet aft end; and
  a bleed cavity defined by a bleed cavity surface that extends from the bleed inlet forward end to the bleed inlet aft end of the bleed inlet aperture, wherein the bleed cavity surrounds the CAC inlet, wherein the bleed cavity surface defines a bleed conduit aperture;
  a bleed conduit that extends radially outward from the bleed conduit aperture; and
  a filter housing removably connected between the bleed conduit and the bleed duct
wherein:
  the filter housing has a filter housing inlet flange; and
  the bleed conduit has a bleed conduit outlet flange that is releasably connected to the filter housing inlet flange;
  the filter housing has a filter housing outlet flange; and
  the bleed duct has a bleed duct inlet flange that is releasably connected to the filter housing outlet flange;
  the bleed duct defines an air conduit port through which an air conduit extends such that an outlet of the air conduit is directed toward filter media in the filter housing; and
  the air conduit is fluidly coupled to a pressurized air source;
  a control valve that is fluidly coupled between the pressurized air source and the air conduit,
  wherein, in operation, the control valve is normally in a closed state and is configured to transition to an opened state when a pressure-drop across the filter media is greater than a threshold.

7. The CAC of claim 6, wherein:
in the opened state, the control valve is configured to transition to the closed state after a predetermined period of time.

8. A method of operating a cabin air compressor (CAC), comprising:
directing airflow into a CAC inlet at a forward end of a case of the CAC, to an impeller that is caused to rotate by a rotor and is surrounded by a rotor section, and out of a discharge that is fluidly coupled to the impeller; and
directing a bleed portion of the airflow from the CAC inlet, through a bleed duct, to a motor that is surrounded by a motor section via a radial inlet gap in the CAC inlet defined between:
a scoop forward end of a scoop that is connected to a bleed inlet aft end of a bleed inlet that is defined in the CAC inlet, wherein the scoop is frustoconical and converges toward the forward end of the case; and
a bleed inlet forward end of the bleed inlet,
wherein the bleed inlet circumferentially extends about the CAC inlet to define the bleed inlet forward end and the bleed inlet aft end
directing the bleed portion of the airflow through a filter housing that is removably connected to a bleed conduit of the CAC inlet,
wherein the bleed conduit extends from a bleed conduit aperture defined by a bleed cavity surface, and wherein the bleed cavity surface extends from the bleed inlet forward end to the bleed inlet aft end and surrounds the CAC inlet and
directing the bleed portion from the filter housing through the bleed duct;
directing pressurized air, through an air conduit outlet of an air conduit extending through an air conduit port defined in the bleed duct, toward filter media in the filter housing;
transitioning a control valve, that is fluidly coupled to the air conduit, intermediate of the air conduit outlet and a pressurized air source, to an opened state when a pressure drop across the filter media exceeds a threshold; and
transitioning the control valve to a closed state after a predetermined period of time.

* * * * *